(12) United States Patent
Zybura et al.

(10) Patent No.: US 7,584,219 B2
(45) Date of Patent: *Sep. 1, 2009

(54) INCREMENTAL NON-CHRONOLOGICAL SYNCHRONIZATION OF NAMESPACES

(75) Inventors: John H. Zybura, Seattle, WA (US);
Max L. Benson, Redmond, WA (US);
Herman Man, Issaquah, WA (US);
Edward H. Wayt, Seattle, WA (US);
Felix W. Wong, Bellevue, WA (US);
Jing Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 940 days.

This patent is subject to a terminal disclaimer.

(21) Appl. No.: 10/669,866

(22) Filed: Sep. 24, 2003

(65) Prior Publication Data

US 2005/0065978 A1 Mar. 24, 2005

(51) Int. Cl.
G06F 17/30 (2006.01)
G06F 17/00 (2006.01)
G06F 15/16 (2006.01)

(52) U.S. Cl. .............. 707/200; 707/1; 707/10; 707/104.1; 707/205; 709/203

(58) Field of Classification Search .......... 707/1–4, 707/10, 100–104.1, 200, 205; 709/220–225, 709/247–248, 203; 717/103–105, 116–118
See application file for complete search history.

(56) References Cited

U.S. PATENT DOCUMENTS

| | | | | |
|---|---|---|---|---|
| 5,893,116 A | * | 4/1999 | Simmonds et al. | 707/201 |
| 5,903,753 A | * | 5/1999 | Bramnick et al. | 719/328 |
| 6,061,743 A | * | 5/2000 | Thatcher et al. | 719/328 |
| 6,154,212 A | * | 11/2000 | Eick et al. | 715/848 |
| 6,269,405 B1 | | 7/2001 | Dutcher et al. | |
| 6,269,406 B1 | | 7/2001 | Dutcher et al. | |
| 6,581,074 B1 | * | 6/2003 | Wong et al. | 707/201 |
| 6,604,148 B1 | * | 8/2003 | Dennison | 709/245 |
| 6,611,847 B1 | * | 8/2003 | Fontana et al. | 707/201 |
| 6,725,262 B1 | * | 4/2004 | Choquier et al. | 709/221 |
| 6,877,018 B2 | * | 4/2005 | Oshins et al. | 707/206 |
| 6,895,586 B1 | * | 5/2005 | Brasher et al. | 719/313 |

(Continued)

FOREIGN PATENT DOCUMENTS

CA 2299387 * 8/2000 ............. 3/53

(Continued)

OTHER PUBLICATIONS

Jay Allen et al "Highly available LDAP", published Jan. 12, 2002 10 pages.*

(Continued)

*Primary Examiner*—Srirama Channavajjala

(57) ABSTRACT

Described are mechanisms and techniques for enabling incremental non-chronological synchronization of namespaces. In an environment, entities must have unique names within a namespace and entities may only refer to entities that actually exist within the namespace. Synchronizing two such namespaces involves providing a mechanism for indicating that an entity has been created because a reference to that entity has been made even though that entity does not yet exist. At such time as the entity is formally created, the indication is removed. Synchronizing two such namespaces also involves providing a mechanism for indicating that an entity's unique name in the namespace has been compromised through the synchronization process.

14 Claims, 8 Drawing Sheets

U.S. PATENT DOCUMENTS

| | | | |
|---|---|---|---|
| 6,952,704 B2 * | 10/2005 | MacLeod et al. | 707/103 R |
| 2002/0095479 A1 * | 7/2002 | Schmidt | 709/218 |
| 2002/0133487 A1 * | 9/2002 | Oshins et al. | 707/5 |
| 2003/0131104 A1 * | 7/2003 | Karamanolis et al. | 709/225 |
| 2003/0145003 A1 | 7/2003 | Yellepeddy et al. | |
| 2003/0195870 A1 * | 10/2003 | Newcombe et al. | 707/3 |
| 2003/0225753 A1 * | 12/2003 | Balassanian et al. | 707/3 |
| 2004/0172421 A1 * | 9/2004 | Saito et al. | 707/200 |
| 2004/0225675 A1 * | 11/2004 | Benson | 707/102 |
| 2004/0267752 A1 * | 12/2004 | Wong et al. | 707/9 |
| 2005/0027734 A1 * | 2/2005 | MacLeod et al. | 707/102 |
| 2005/0044103 A1 * | 2/2005 | MacLeod et al. | 707/102 |

FOREIGN PATENT DOCUMENTS

| | | | | |
|---|---|---|---|---|
| EP | 0661633 | * | 7/1995 | 9/46 |
| EP | 1526452 | * | 4/2005 | |

OTHER PUBLICATIONS

Arcot Rajasekar et al. "accessing sensor data using meta data: a virtual object ring buffer framework", DMSN, Aug. 2005, pp. 35-42.*

Release notes for iPlanet meta-directory version 5.0 SP1 Patch 2, Sep. 2002, 20 pages.*

Joe Gallant, "data synchronization in intermittently connnected applications",Intersystems Devcon 2004.*

Brendan Bellina, "topics in directories: metadirectories" practices in higher education, 12 Base CAMP Jun. 2002, 28 pages.*

Jan De Clercq, HP security office, "windows and Unix account management and authentication integration", 200344 pages.*

Mathew Fluet et al. "practical datatype specializations with phantom types and recursion schemes", ML 2005 prelimimary version, 25 pages.*

Masahiro Ishiyama et al. "A Mobility Protocol Framework to Support Multiple Namespaces",This paper appears in: Applications and the Internet Workshops, Jan. 2003. Proceedings, pp. 208-213.*

Zheng Zhang, et al. "Designing a Robust Namespace for Distributed File Services",This paper appears in: Reliable Distributed Systems, Oct. 2001. Proceedings. 20th IEEE , pp. 162-171.*

Han Hua, et al. "Global File Store: A Massive Storage System on the Internet—Concept and Design", IEEE 2001, pp. 165-175.*

The Virtual Directory Server: a pragmatic approach to directory deploymen,Radiant Logic Inc—Jan. 2000, 10 pages.*

Eric W. Biederman et al. "Multiple Instances of the Global Linux Namespaces",Proceedings of the Linux Symposium, Jul. 2006, 14 pages.*

"Integrating Network Devices in a Meta-Directory: the MetaComm Experience", Freire et al., Elsevier Science Ltd., 2002, Information Systems 27 (2002) pp. 193-217.

"An Enhanced Message Networking Topology: Multimedia Messaging with the Intuity Interchange Server", Anderl et al., Bell Labs Technical Journal, Apr.-Jun. 1998, pp. 124-135.

"Directory Synchronization", Krishnamurthy, S., Handbook of Electronic Messaging, CRC Press LLC, 1998, Chapter 10, pp. 149-157.

* cited by examiner

| Entity 310 ||
|---|---|
| Name 311 | "Name A" 321 |
| Identity 312 | "GUID{01010}" 322 |
| Reference 313 | Name/ID 323 |
| Data_1 314 | Name/ID 324 |
| Data_2 315 | Name/ID 325 |
| Phantom 316 | True/False 326 |

*Fig. 3*

INCREMENTAL NON-CHRONOLOGICAL SYNCHRONIZATION OF NAMESPACES

TECHNICAL FIELD

This application relates generally to synchronization of information and more specifically to synchronization of information in a plurality of information structures or hierarchies.

BACKGROUND OF THE INVENTION

Often a company stores important information in various data sources. For example, a human resources department may store information about employees in a human resources data source. The human resources data source may be arranged or organized according to a human resources specific information structure or hierarchy. A finance department may also store information about employees, clients, suppliers, etc., in a finance department data source. The finance department data source may be arranged or organized according to a finance department information structure or hierarchy. It is likely that some common information exists in both data sources. Thus, synchronizing the information becomes desirable.

A synchronizing process typically implements rules and/or specifications to adequately harmonize information in various data sources. Further, such a process may rely on an engine capable of executing software and a storage capable of storing the information, as appropriate. In general, the synchronizing process may replicate information from various data sources in a central storage, wherein the replicated information has some degree of integrity. To achieve this task, information from the various data sources are either pushed or pulled into the central storage. In addition, information may be pulled or pushed out of such a central storage to the various data sources.

Often, the information may be provided to the central storage by one of the various data sources non-chronologically. In other words, the modifications that occur at a data source have a temporal relationship. However, due to the nature of synchronization, notification of those modifications may reach the central storage out of order with respect to that temporal relationship. This situation has the potential to create problems during synchronization. Various exemplary methods, devices and/or systems described below are directed at those problems.

SUMMARY OF THE INVENTION

Briefly stated, mechanisms and techniques are described for enabling incremental non-chronological synchronization of namespaces. In an environment, entities must have unique names within a namespace and entities may only refer to entities that actually exist within the namespace. Synchronizing two such namespaces involves providing a mechanism for indicating that an entity has been created because a reference to that entity has been made even though that entity does not yet exist. At such time as the entity is formally created, the indication is removed. Synchronizing two such namespaces also involves providing a mechanism for indicating that an entity's unique name in the namespace has been compromised through the synchronization process.

BRIEF DESCRIPTION OF THE DRAWINGS

FIG. 3 is a functional block diagram generally illustrating information that is included in an "entity" as that term is used in this document.

DETAILED DESCRIPTION

The following description sets forth a specific embodiment of a system for incremental non-chronological synchronization. This specific embodiment incorporates elements recited in the appended claims. The embodiment is described with specificity in order to meet statutory requirements. However, the description itself is not intended to limit the scope of this patent. Rather, the inventors have contemplated that the claimed invention might also be embodied in other ways, to include different elements or combinations of elements similar to the ones described in this document, in conjunction with other present or future technologies.

The following discussion refers to an information environment that includes a metadirectory. While a metadirectory is used here for explanatory purposes, the various mechanisms and techniques described here may also be applied generally to other environments where synchronization of information is desired. In general, information should be identifiable in an information environment, for example, through use of an identifier, and preferably an immutable or traceable identifier. In some instances, information is structured or organized in a hierarchy.

Exemplary Metadirectory System

Figure 1:
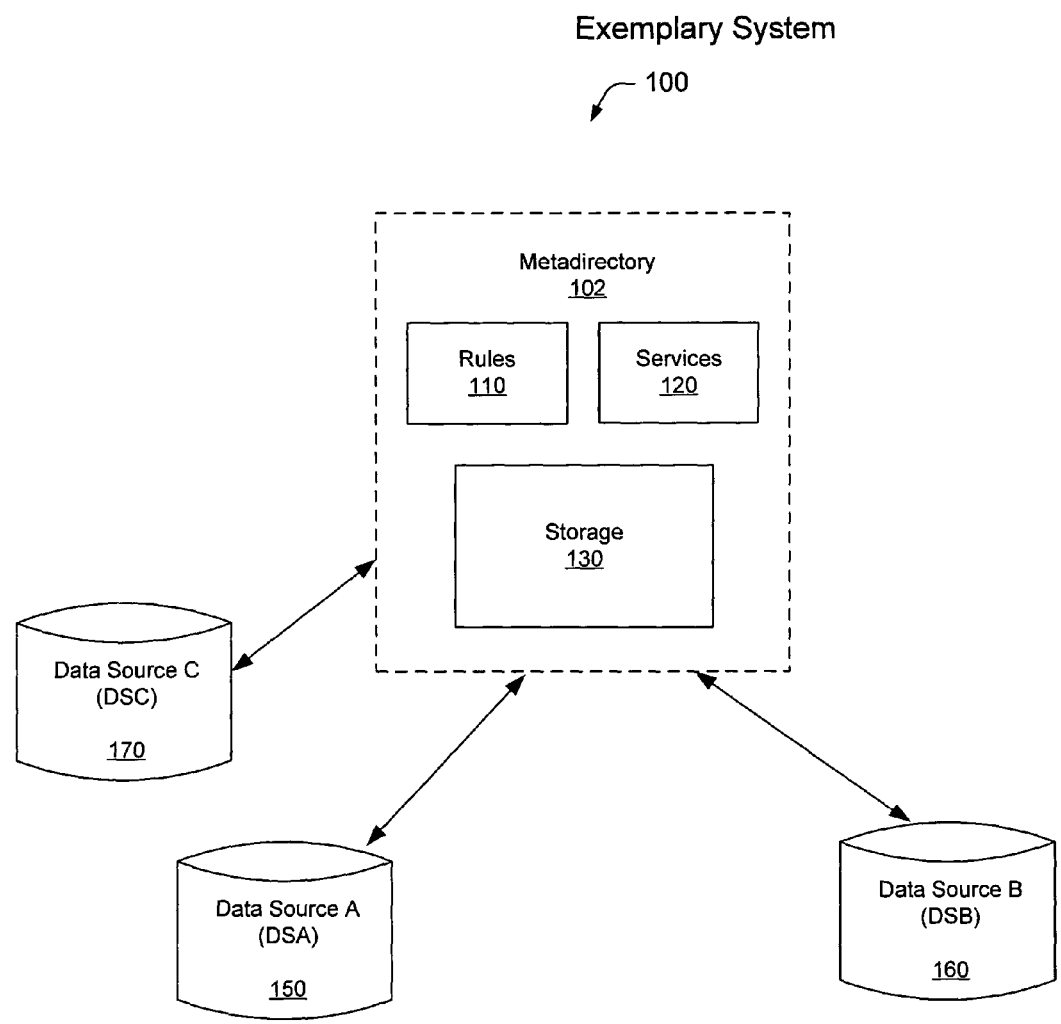
FIG. 1 is a functional block diagram generally illustrating an exemplary system that includes a metadirectory and a plurality of data sources.

FIG. 1 shows an exemplary system 100 that includes an exemplary metadirectory 102 capable of communicating information to and/or from a plurality of data sources (e.g., DSA 150, DSB 160, and DSC 170). Each data source includes many objects, with each object containing information. For this discussion, each object may be thought of as a body of information, such as information about an individual (e.g., name, address, salary), a mailing list (members), an e-mail account (e-mail address), a corporate asset (serial number), or the like. For example if DSA 150 were a human resources database, then objects within DSA 150 may correspond to employees, and each employee may have characteristics such as an employee number, a manager, an office location, and the like.

There may also be an object in another data source that pertains to the same body of information, but includes slightly different characteristics or information. For example, DSB 160 may be an information technology server that includes information about the logon accounts of employees. Accordingly, there may be a corresponding object within DSB 160 for each or many of the objects in DSA 150. However, the particular body of information for the objects within DSB 160 would be slightly different than those within DSA 150. Collectively, the information associated with a particular body of information are sometimes referred to as "identity data" or the like.

The metadirectory 102 is an infrastructure element that provides an aggregation and clearinghouse of the information stored within each of the several data sources associated with the metadirectory 102. The metadirectory 102 includes storage 130 in which reside "entities" that represent the individual bodies of information stored in each associated data source. Disparate information from different data sources that pertains to the same body of information (e.g., an individual, asset, or the like) is typically aggregated into a single entity within the metadirectory 102. In this way, a user can take advantage of the metadirectory 102 to view at a single location information that may be stored piecemeal in several different data sources. Such an exemplary metadirectory may consolidate information contained in multiple data sources in a centralized manner, manage relationships between the data sources, and allow for information to flow between them as appropriate.

The metadirectory 102 includes rules 110 and services 120 that are used to aggregate, consolidate, synchronize, and otherwise maintain the integrity of the information presented through the metadirectory 102. The rules 110 and services 120 form or define one or more protocols, APIs, schemata, services, hierarchies, etc. In this particular embodiment, the rules 110 include methods and techniques for achieving incremental non-chronological synchronization of information presented to the metadirectory 102, as will become more clear in the description that follows.

The storage 130 is for storing the aggregated and consolidated information 11 from each of the associated data sources. The storage 130 may be a database or any other mechanism for persisting data in a substantially permanent manner. As will be described more fully in conjunction with FIG. 2, the storage 130 may include core storage (sometimes referred to as a "metaverse"), in which the data is deemed to be valid, and transient storage (e.g., a buffer or connector space) used to temporarily store information awaiting inclusion in the core storage. In other words, changes, additions, or deletions to information in one or more data sources may be presented to the metadirectory 102 and temporarily stored in a buffer until they can be committed to the core storage.

Figure 2:
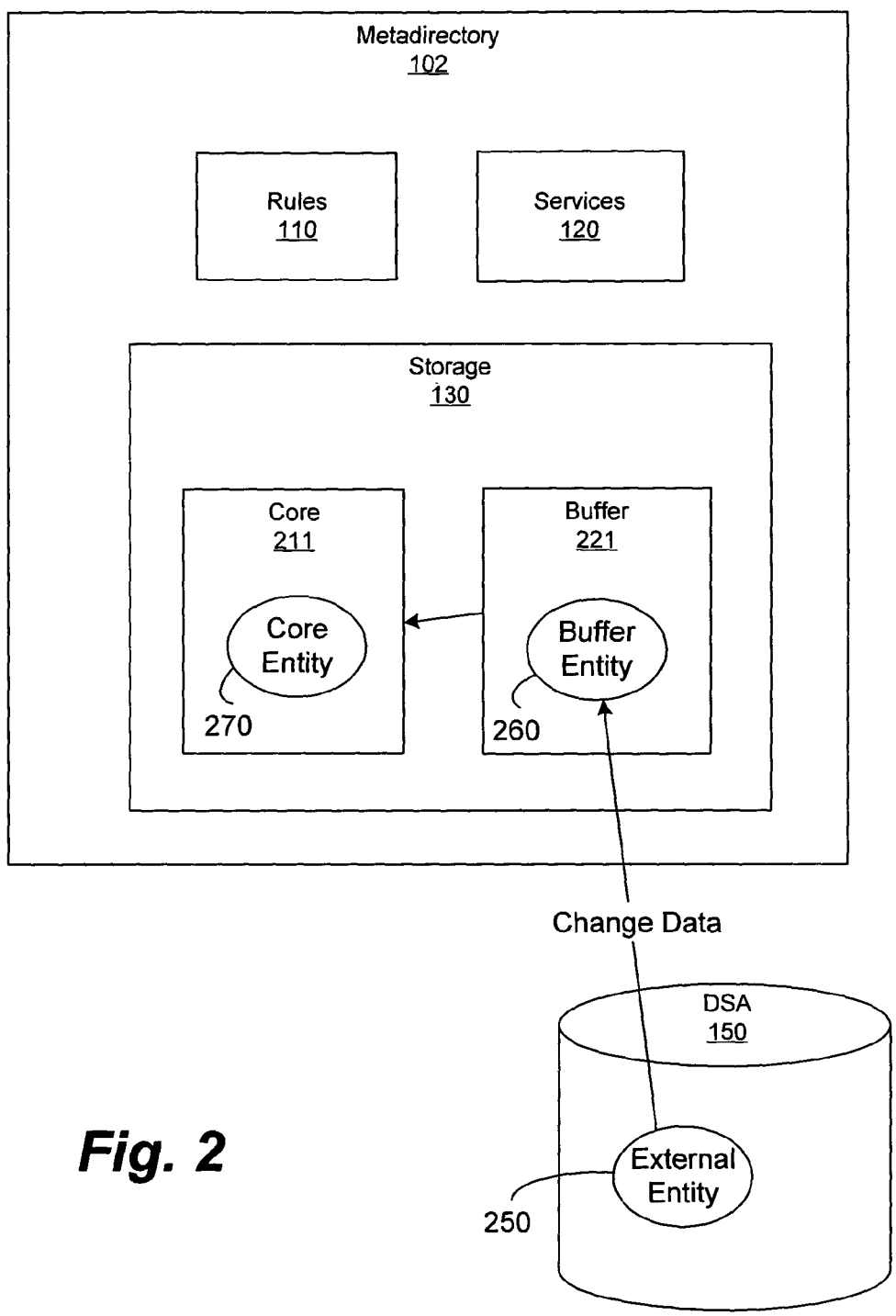
FIG. 2 is a functional block diagram illustrating in slightly greater detail the storage of the metadirectory as it interacts with various data sources.

FIG. 2 is a functional block diagram illustrating in slightly greater detail the storage 130 of the metadirectory 102 as it interacts with the various data sources. The data stored within the system are termed "entities" for the purpose of this discussion (e.g., core entity 270, buffer entity 260, external entity 250). Generally stated, entities are objects that include any arbitrary collection of data (e.g., current values, change information, etc.) about the bodies of information that reside in the various data sources. Entities within the metadirectory 102 may be referred to collectively as "central entities," and entities outside the metadirectory 102 (e.g., within the data sources) may be referred to collectively as "external entities."

For example, a central entity within the metadirectory 102 may correspond to two or more external entities and include an aggregation of the information stored in each of the corresponding external entities. More specific detail about entities is provided below in conjunction with FIG. 3.

As mentioned above, the storage 130 may include a core 211 and a buffer 221. The core 211 represents data that is considered to accurately reflect (from the perspective of a user of the metadirectory 102) the information in the various data sources. In contrast, the buffer 221 includes data of a more transient nature. Recent changes to data at the data sources are reflected in the buffer 221 until that data can be committed to the core 211.

As illustrated, a data source (e.g., DSA 150) presents to the metadirectory 102 change data that represents changes to an external entity (e.g., external entity 250) stored within the data source. The change data may indicate that information about an entity within the data source has changed in some fashion, or perhaps the change data indicates that its corresponding entity has been deleted or added. A buffer entity (e.g., buffer entity 260) is first created using the change data to create an entity that represents the external entity (e.g., external entity 250) at the data source (e.g., DSA 150). Essentially, the buffer entity 260 mirrors its corresponding external entity 250. Other data sources (not shown) may also be presenting their own change data to the buffer 221 as well. The change data may sometimes be referred to as "delta information" or "deltas."

As used in this document, the term "namespace" means any set of entities. The entities in a namespace may be unordered. Accordingly the term namespace may be used to refer to any set of entities, such as the core 211 or the buffer 221 (i.e., a core namespace or a buffer namespace). Or the term namespace may be used to refer collectively to the metadirectory 102 as a namespace. Similarly, any of the data sources may sometimes be referred to as namespaces.

A process termed synchronization occurs to reconcile the external entities within the data sources with their corresponding central entities within the metadirectory 102. For instance, in this example the external entity 250 is associated with the buffer entity 260. Through the synchronization process, modifications represented in the external entity 250, as well as perhaps other external entities, become reflected in the buffer entity 260. By creating this synchronized relationship between two namespaces (e.g., the buffer 221 and the DSA 150), the pair of namespaces may be referred to as "correlated namespaces."

Synchronization may be more generally defined as any process which causes two non-identical namespaces (e.g., the buffer 221 and the DSA 150) to converge to identity over a finite period of time. In various examples in this document, one namespace is sometimes referred to as the master, and it is allowed to be modified by other processes. Using the terminology of this discussion, the DSA 150 is the master. In this example, the other namespace is referred to as the slave, and it may only be modified by the synchronization process. Again, using the terminology of this discussion, the buffer 221 is the slave.

Typically, the synchronization process is not instantaneous. That is, the time to convergence for the system is nonzero. Such synchronization processes may be termed periodic, since the non-zero convergence time generally means the synchronization processes itself is not continuously active, but rather is invoked on a schedule. Thus, a periodic synchronization process could be described by the following steps:

1) Select from the master (e.g., the DSA 150) a set of changes to apply to the slave (e.g., the buffer 221) that is sufficient to bring the two namespaces into convergence. Thus the set should include all changes made to the master since the last time it synchronized with the slave. In simple implementations, this set could simply the set of all entities in the master, where each entity is represented as a modify-entity event which would set all properties. The resultant set is called the synchronization feed.

2) Iterate, in arbitrary order, through the set of changes (i.e., consume the feed) obtained in the previous step. If the change is add-entity, then an entity is created in the slave namespace. Otherwise, apply the change to the appropriate entity in the slave namespace.

Finally, a periodic synchronization process is said to be incremental if each change read from the synchronization feed is performed independently on the slave namespace. By contrast, a non-incremental synchronization process would be one in which the entire summation of all changes in the feed are performed in a single, atomic update. In practice, virtually all synchronization processes are incremental. The amount of data which may need to be transferred during a given invocation of the synchronization process is effectively unbounded, which would make it prohibitively expensive to use batching or transactional logic in the underlying data source to achieve an atomic write from the summation of all synchronization modifications.

The general process of incremental synchronization as just described allows for the possibility that the changes in the synchronization feed could be applied in non-chronological order. That is to say, the order of changes applied to the slave as a result of processing the synchronization feed is not necessarily the same as the order in which the changes were originally applied to the master namespace. In fact, for the simplest implementation where simply all entities in the master namespace are selected every time, the resultant will feed will almost always be non-chronological.

Consuming a non-chronological feed can result in temporary data artifacts in the slave namespace which could violate constraints placed on a namespace. These artifacts are described as temporary because they can only be seen if the state of the slave namespace is viewed after each individual change in the feed is consumed; the artifacts should not remain once the synchronization feed has been depleted. Thus, the artifacts are not problematic if the synchronization process is non-incremental, since the final state of the namespace written to the data store would be consistent. However, these artifacts do pose problems for incremental synchronization processes since each individual change is performed in the slave namespace independently, and any of these changes could violate the namespace constraints and leave the slave in an inconsistent state.

Figure 5:
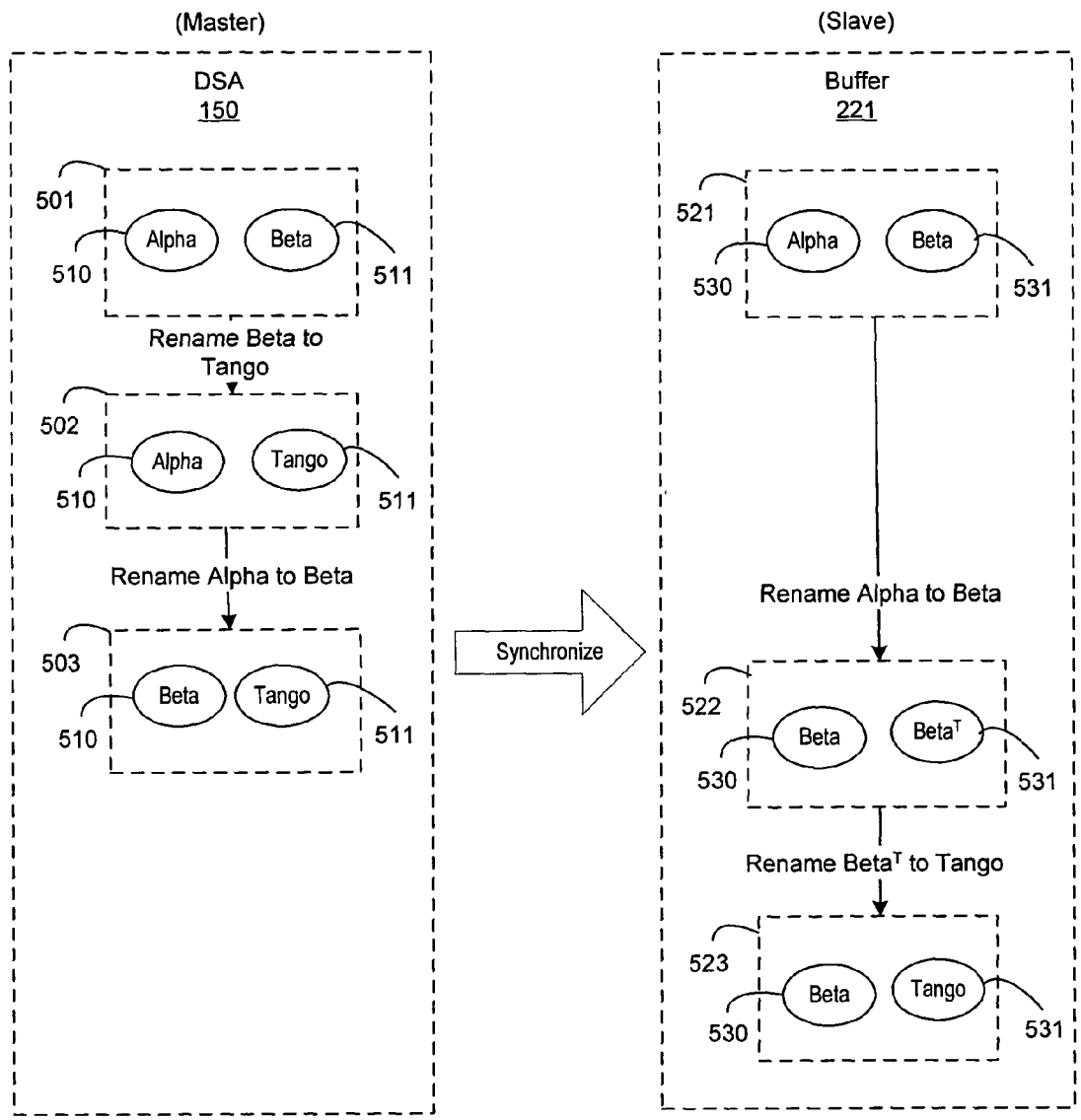
FIG. 5 is a graphical illustration of a synchronization between a master namespace and a slave namespace that suffers from name collision.
Figure 6:
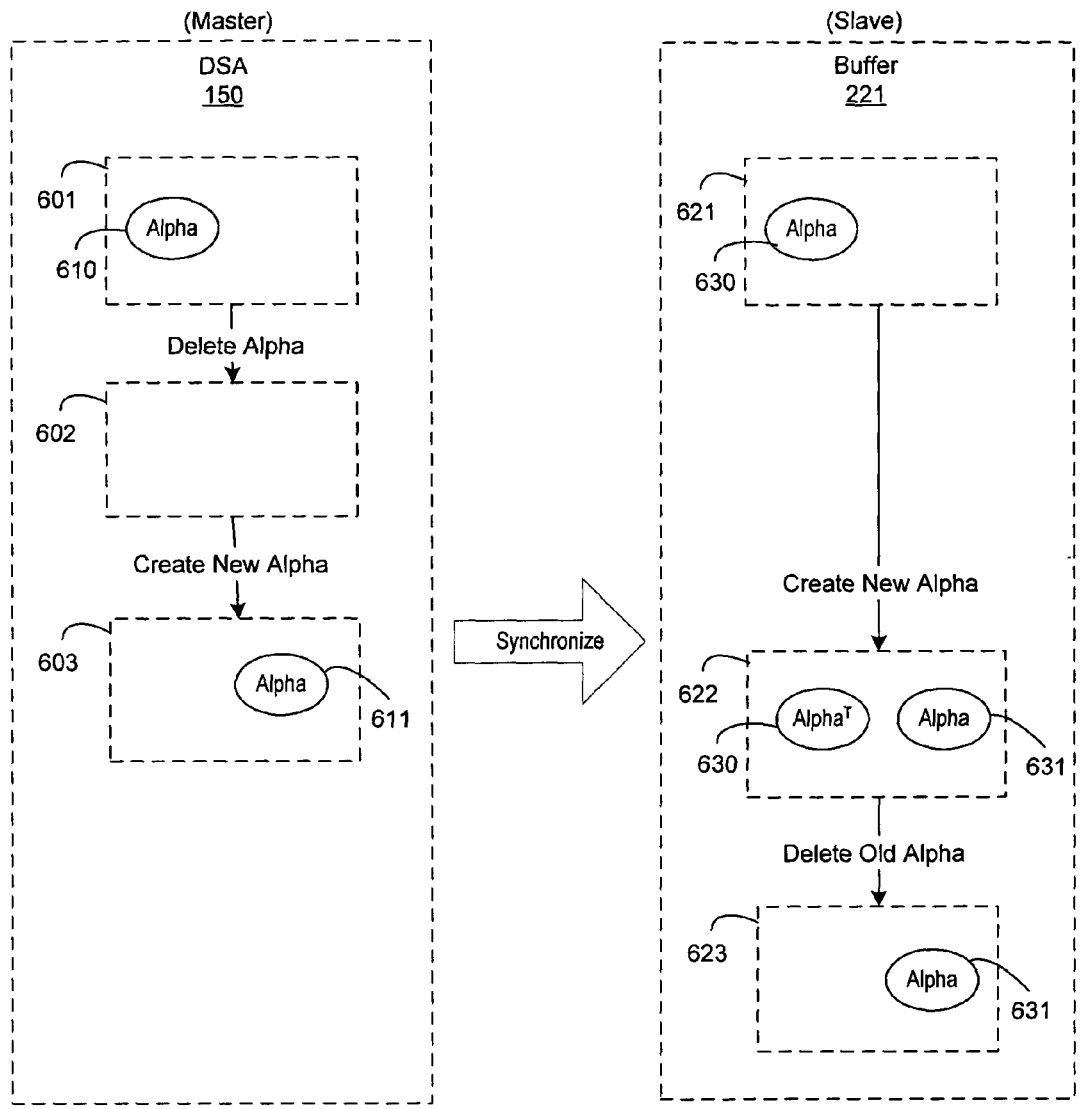
FIG. 6 is a graphical illustration of another synchronization between a master namespace and a slave namespace that also suffers from name collision.
Figure 7:
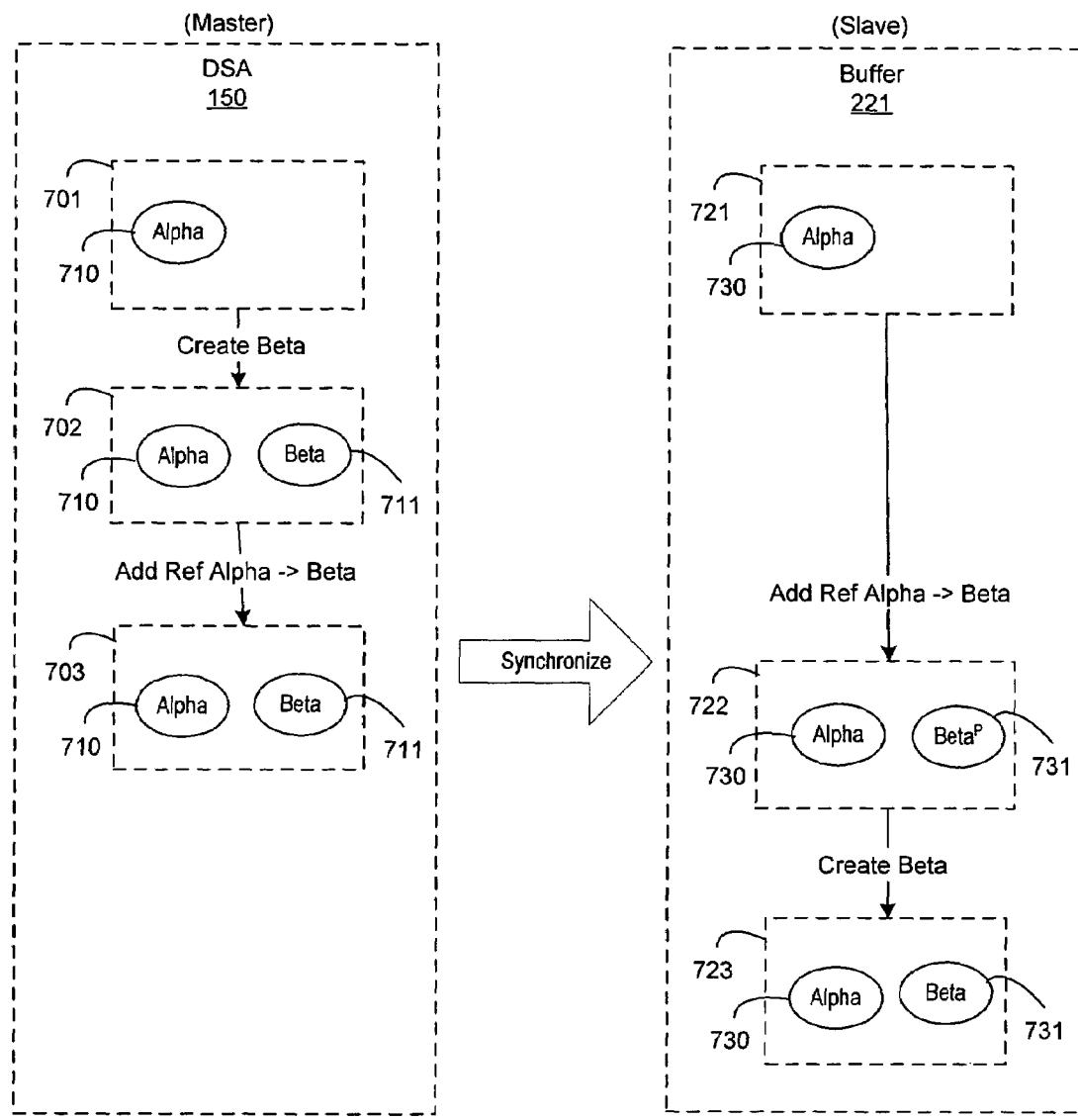
FIG. 7 is a graphical illustration of a synchronization between a master namespace and a slave namespace that suffers from a dangling reference.

Specifically, two types of data artifacts can occur when incrementally consuming a non-chronological synchronization feed, name collision and dangling references. Name collision occurs when an external entity is processed which either adds a new buffer entity or changes the name of an existing buffer entity and results in duplicate names, which violates the namespace constraint that all names be unique at a single point in time. Examples of how name collision can occur are illustrated in FIGS. 5 and 6 and described below. Dangling references occur when a buffer entity refers to another entity that does not yet exist because the change that would create it has not yet been processed. A dangling reference violates the namespace constraint that all reference values contain the names of existing entities. An example of how a dangling reference can occur is illustrated in FIG. 7 and described below.

Note that these constraint violations are only temporary artifacts of the synchronization process. A successfully completed synchronization process should not exhibit these problems. However, for an incremental synchronization process, these temporary artifacts can adversely affect the system during intermediate stages between separately transacted modifications made to the slave namespace. Most data sources would not allow the temporary relaxation of these types of constraints. And the fact that the incremental synchronization process is non-atomic means an aborted or unsuccessfully completed process could result in these artifacts persisting after the process has ended.

FIG. 3 is a functional block diagram generally illustrating information that is included in an "entity" 310 as that term is used in this document. The entity 310 includes a name (e.g., name 311), which preferably has a string value 321 unique across the namespace. The name can change at any time. Each entity also includes an identity (e.g., identity 312), which is preferably a string value 322 that is globally unique. The identity of an entity does not change, i.e. it is an immutable property of the entity 310.

The use of both a name and a unique identifier may at first appear redundant, but each has a special purpose. For example, a human-readable name is intuitive and may be used to reflect a real-world property or concept, thus making the name very useful to users. However, this usability typically means that the name should also be changeable. In contrast, a globally unique identifier conveys little in terms of readability or intuitive message. It does however, effectively distinguish the entity from every other entity in existence.

The entity 310 may also include an arbitrary number of reference attributes (e.g., reference attribute 313) that contain name/identity pairs 323 of other entities within the same namespace referred to by the referring entity. The reference attribute 313 may have a single reference pair, or it may include multiple reference pairs, such as a distribution list. The reference attributes allow the modeling of arbitrary, directed relationships between entities. The entity 310 may also include an arbitrary number of user data attributes (e.g., data_1 314 and data_2 315) that contain user data (e.g., user info 324 and 325, respectively).

The entity 310 also includes a "phantom" attribute 316, which has special meaning in the context of this discussion. As described above, the process of incremental non-chronological synchronization can result in dangling references (an entity that does not yet exist is referred to by a changed entity). The phantom attribute 316 is a Boolean-valued property 326 of the entity 310 used to indicate that the entity has not yet been officially "created" but yet must exist in the namespace because it has been referred to by another entity. Use of the phantom attribute allows the creation of a "placeholder state," which is essentially somewhere between an officially-created entity and a non-existent entity. Other constraints may be put on the entity 310 if the phantom property 316 is true. For instance, no other data may be allowed to be stored in a phantom entity except the name 311 and identity 312. Use of the placeholder state is illustrated in FIG. 7.

The following guidance is provided for handling phantoms or entities in the placeholder state. First, if an add-entity event occurs and there already exists a phantom entity with the same identity, then the phantom entity is promoted to a non-placeholder entity. If a delete-entity event occurs and the entity to be deleted has references to it in the slave namespace, then the entity is demoted to a phantom entity.

If a change to an entity occurs that adds a value to a reference attribute and the referent does not exist, then a phantom entity is created with the correct name and identity and is used as the referent. If a change to an entity occurs that deletes a value from a reference attribute and a phantom entity was being referred to, the phantom entity is checked to see if it still has anything else referring to it. If not, then the phantom entity is deleted. Note that this process does not have to be immediate. Rather, at the end of the synchronization process, a final sweep can be made to find any phantom entities without references to them. If found, these orphaned phantom entities may then be deleted.

Figure 4:
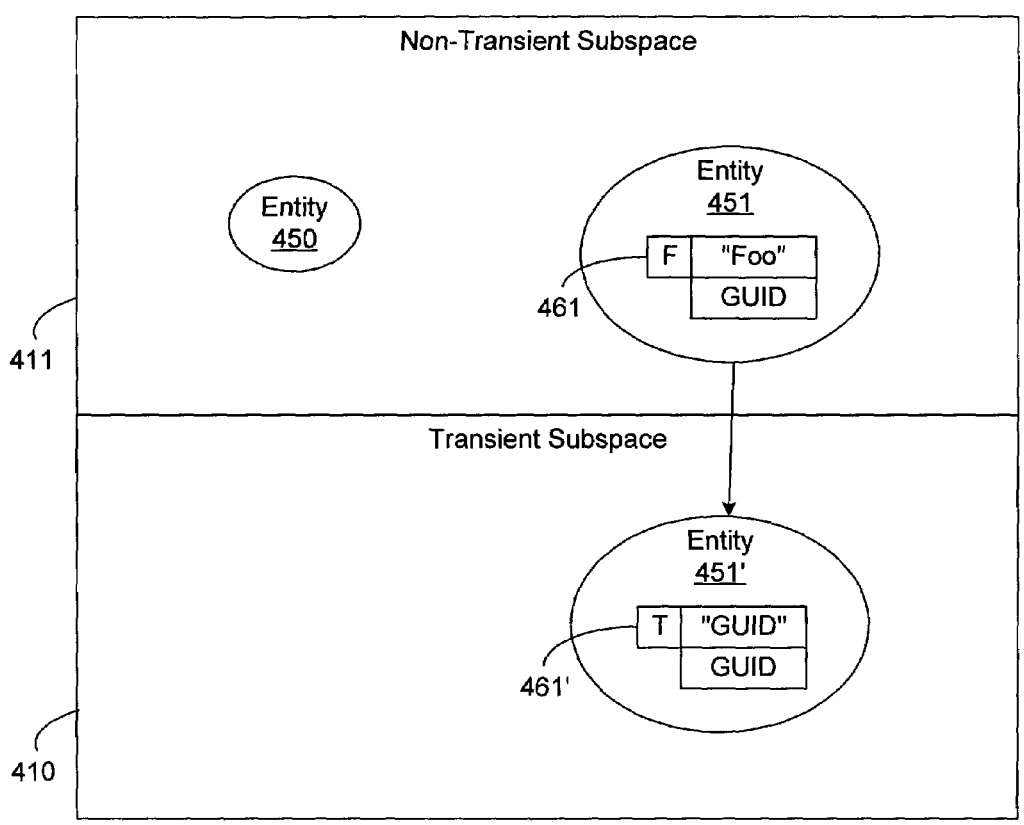
FIG. 4 is a graphical representation of a mechanism for addressing name collision during an incremental non-chronological synchronization.

FIG. 4 is a graphical representation of a mechanism for addressing name collision during an incremental non-chronological synchronization. More specifically, illustrated is a slave namespace partitioned into two subspaces, a transient subspace 410 and a non-transient subspace 411. The non-transient subspace 411 is configured sufficient to contain every possible name in the master namespace. Accordingly, the non-transient subspace 411 is sufficient to include every entity (e.g., entity 450) in the slave namespace if every single entity is is uniquely named (as is the constraint) and is non-transient.

Recall that name collision occurs when an entity (which could be a phantom entity) is introduced that violates the constraint that no two entities within a namespace have the same name. Name collision can occur if the name of an existing entity is changed to an already taken name or if a new entity (which could be a phantom entity) is given a name that conflicts with an existing name (possibly the name of an existing phantom entity) prior to another change that would resolve the conflict. To address this situation, the entity is moved to the transient namespace 410 by changing the name of the existing entity to some value that cannot conflict with other entities. The use of the entity's identity (which is globally unique) in combination with (or in lieu of) the entity's name would suffice to prevent name collision. Accordingly, the transient subspace 410 is configured sufficient to contain every possible identity value in the master namespace. Upon being identified as transient, an entity's name may be changed to its identity or a combination of its identity and its name.

Another Boolean-valued flag in the data store for the slave namespace may be used to indicate that an entity is transient. The flag in combination with the string-valued name may also be used as a logical unique "name" for transient entities. For example, entity 451 has a flag 461 that is currently set False and a name "Foo." Upon being identified as transient, the entity 451' is moved to the transient subspace 410 by setting the flag 461' to True. In addition, the name of the entity is changed to its identifier "GUID."

The following guidance is provided for handling transient entities, or entities that result from a name collision. If an add-entity event occurs and there already exists an entity with the same name but a different identity, the existing entity is made transient. If a entity's name is changed but there already exists an entity with the new name but a different identity, the existing entity is made transient. A modify-entity event should be treated as a name change if the entity to which the event refers is currently transient. That is, receiving a change to an entity currently identified as transient should bring it out of the transient state. Note that bringing an entity out of the transient state should be treated the same as any other change. Any existing entities with conflicting names should in turn be made transient.

The concepts and principles of these mechanisms and techniques will now be described with reference to certain examples of operation. Of course, these examples are for illustrative purposes only and are indeed not exhaustive of the various applications of these mechanisms and techniques.

FIG. 5 is a graphical illustration of a synchronization between a master namespace (DSA 150) and a slave namespace (buffer 221) that suffers from name collision. Shown are a data source (i.e., DSA 150) acting as a master namespace, and a buffer 221 acting as a slave. The sequence of events occurs from top to bottom, where the state of the DSA 150 changes over time. Initially, at state 501, the DSA 150 includes a first entity 510 currently named Alpha, and a second entity 511 currently named Beta. At that point, the second entity 511 is renamed from Beta to Tango, resulting in state 502. Subsequently, the first entity 510 is renamed to Beta.

At that point an incremental synchronization occurs between the DSA 150 and the buffer 221. Initially, at state 521, the buffer 221 matches the initial state 501 of the DSA 150. However, the changes to entities within the DSA 150 are transmitted to the buffer 221 out of order. Thus, the first change that occurs in the buffer 221 is that the first entity 530 is renamed from Alpha to Beta, thus resulting in a name conflict. Note that the second entity 531 has not yet been renamed. Accordingly, the second entity 531 is identified as transient in an appropriate manner, resulting in state 522. As described above, the name of the second entity 531 is changed in some fashion that prevents the two entities from sharing the same name. Subsequently, a change is received that renames the second entity 531 from Beta to Tango. Thus, the transient state of the second entity 531 is changed to non-transient, and its name is changed to Tango, resulting in state 523.

Note that when the synchronization is complete, the final state 523 of the buffer 221 matches the final state 503 of the DSA 150, and there are no remaining artifacts (i.e., there are no remaining transients).

FIG. 6 is a graphical illustration of another synchronization between a master namespace (DSA 150) and a slave namespace (buffer 221) that also suffers from name collision. Shown again are a DSA 150 acting as a master namespace, and a buffer 221 acting as a slave. The sequence of events occurs from top to bottom, where the state of the DSA 150 changes over time. Initially, at state 601, the DSA 150 includes only a first entity 610 currently named Alpha. At that point, the first entity 610 is deleted, and the DSA 150 is empty at state 602. Subsequently, at state 603, the second entity 611 is created and named Alpha.

At that point an incremental synchronization occurs between the DSA 150 and the buffer 221. Initially, at state 621, the buffer 221 matches the initial state 601 of the DSA 150. However, the changes to entities within the DSA 150 are transmitted to the buffer 221 out of order. Thus, the first change that occurs in the buffer 221 is that the second entity 631 is created and named Alpha, thus resulting in a name collision with the first entity 630. Accordingly, the first entity 630 is identified as transient in an appropriate manner, resulting in state 622. As described above, the name of the first entity 630 is also changed in some fashion that prevents the two entities from sharing the same name. Subsequently, a change is received that deletes the first entity 630, resulting in state 623.

Note that when the synchronization is complete, the final state 623 of the buffer 221 matches the final state 603 of the DSA 150, and there are no remaining artifacts (i.e., there are no remaining transients).

FIG. 7 is a graphical illustration of a synchronization between a master namespace (DSA 150) and a slave namespace (buffer 221) that suffers from a dangling reference. Shown again are a DSA 150 acting as a master namespace, and a buffer 221 acting as a slave. The sequence of events occurs from top to bottom, where the state of the DSA 150 changes over time. Initially, at state 701, the DSA 150 includes a first entity 710 currently named Alpha. At that point, a second entity 711 named Beta is created, resulting in state 702. Subsequently, a reference is added to the first entity 710 that points to the second entity 711.

At that point an incremental synchronization occurs between the DSA 150 and the buffer 221. Initially, at state 721, the buffer 221 matches the initial state 701 of the DSA 150. However, the changes to entities within the DSA 150 are transmitted to the buffer 221 out of order. Thus, the first change that occurs in the buffer 221 is that a reference is added to the first entity 730 that points to the second entity 731, but the second entity 731 has not yet been created. Accordingly, a phantom entity 731 is created having the name referred to by the first entity 730. As described above, a flag or bit within a typical entity may be used to indicate that the phantom entity 731 is a placeholder. Subsequently, a change is received that formally creates the second entity 731, and thus the phantom status is removed from it, resulting in state 723.

Note that when the synchronization is complete, the final state 723 of the buffer 221 matches the final state 703 of the DSA 150, and there are no remaining artifacts (i.e., there are no phantom entities).

Under normal conditions, a successfully completed synchronization process should leave the slave namespace (e.g., the buffer 221) in such a state that it has no transients or phantoms. This follows directly from the definition of a synchronization process, which stipulates that after a successfully completed synchronization the master and slave namespace are identical.

If the slave namespace is left in a state with transients or phantoms, an error conditions occurs. If a synchronization process has terminated abnormally, then the application could simply warn the user about the presence of these entities, since subsequent resumption of the synchronization process should resolve their presence.

A different action may be appropriate if either transients or phantoms remain after a synchronization process has completed successfully. This situation can be result from two scenarios. First, the presence of transients after a successful synchronization process means the synchronization feed contains invalid data, and an error should be raised. The presence of phantoms after a successful synchronization would also mean the synchronization feed is invalid, as long as the synchronization process is always synchronizing all entities in both the master and slave namespaces.

However, phantoms can remain after a successful synchronization if the synchronization process is modified such that only a subset of entities in the master namespace is synchronized with a corresponding subset in the slave namespace. Such a process may be called filtered synchronization, and it differs from normal synchronization in that it is possible for entities within the filtered subset to contain references to entities outside the filtered subset. Otherwise, filtered synchronization is identical to normal synchronization, except that the constraints on the process with respect to convergence only apply to the synchronized subsets of the master and slave namespaces. When the techniques described here operate on a filtered synchronization process, it is possible that phantom entities will remain if there are such references. From this perspective, phantoms may in fact be considered a useful tool in the representation of references to filtered entities in the underlying data source.

Figure 8:
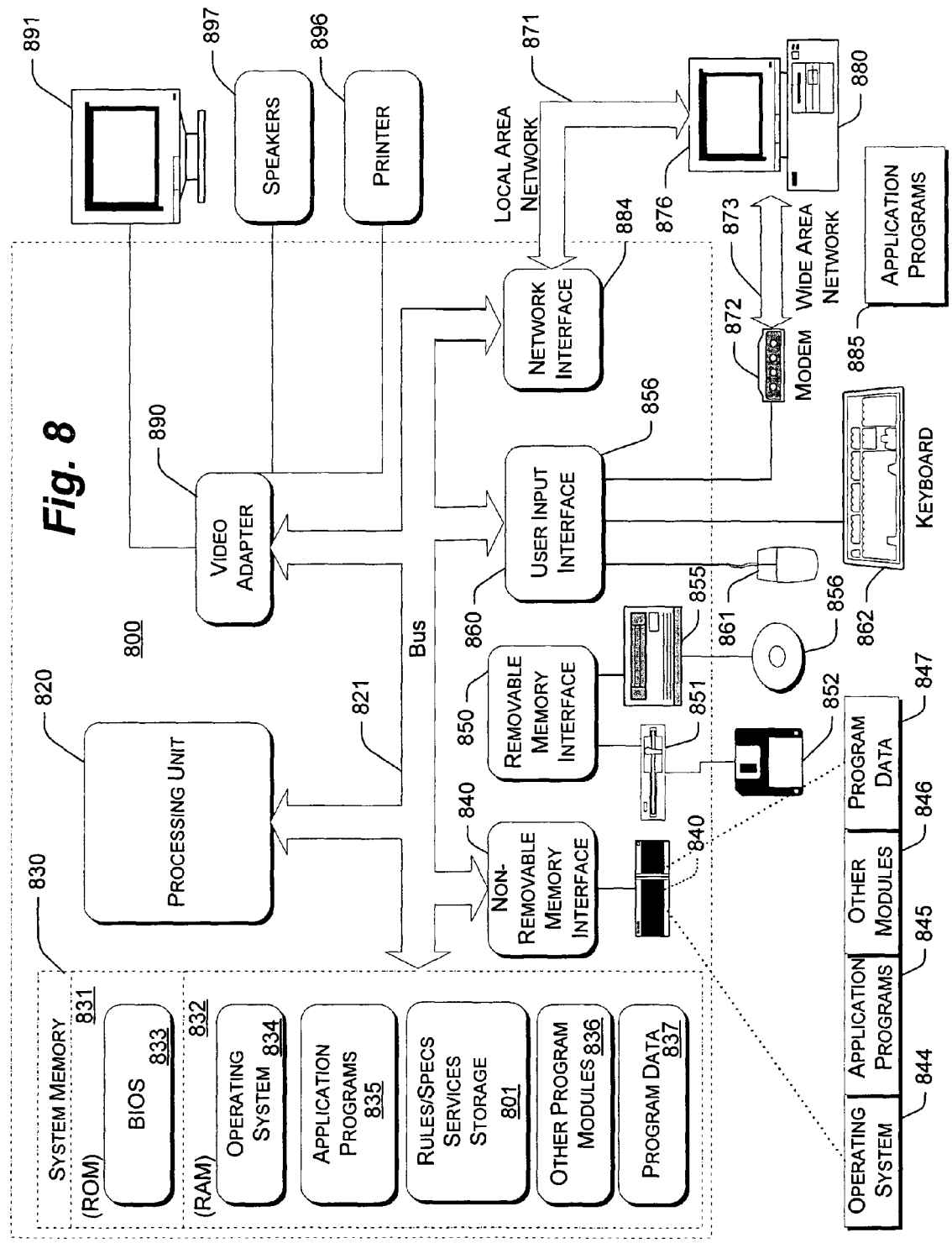
FIG. 8 shows an exemplary computer suitable as an environment for practicing various aspects of subject matter disclosed herein.

FIG. 8 shows an exemplary computer 800 suitable as an environment for practicing various aspects of subject matter disclosed herein. Components of computer 800 may include, but are not limited to, a processing unit 820, a system memory 830, and a system bus 821 that couples various system components including the system memory 830 to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computer 800 typically includes a variety of computer-readable media. Computer-readable media can be any available media that can be accessed by computer 800 and includes both volatile and nonvolatile media, removable and non-removable media. By way of example, and not limitation, computer-readable media may comprise computer storage media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 800. By way of example, and not limitation, communication media includes wired media such as a wired network or direct-wired connection and wireless media such as acoustic, RF, infrared and other wireless media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 800, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, the exemplary rules/specifications, services, storage 801 (e.g., storage may occur in RAM or other memory), application programs 835, other program modules 836, and program data 837. Although the exemplary rules/specifications, services and/or storage 801 are depicted as software in random access memory 832, other implementations may include hardware or combinations of software and hardware.

The exemplary computer 800 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface such as interface 850.

The drives and their associated computer storage media discussed above and illustrated in FIG. 8 provide storage of computer-readable instructions, data structures, program modules, and other data for computer 800. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the exemplary computer 800 through input devices such as a keyboard 862 and pointing device 861, commonly referred to as a mouse, trackball, or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port, or a universal serial bus (USB). A monitor 891 or other type of display device is also connected to the system bus 821 via an interface, such as a video interface 890. In addition to the monitor 891, computers may also include other peripheral output devices such as speakers 897 and printer 896, which may be connected through an output peripheral interface 895.

The exemplary computer 800 may operate in a networked environment using logical connections to one or more remote computers, such as a remote computer 880. The remote computer 880 may be a personal computer, a server, a router, a network PC, a peer device or other common network node, and typically includes many or all of the elements described above relative to computer 800, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets, and the Internet.

When used in a LAN networking environment, the exemplary computer 800 is connected to the LAN 871 through a network interface or adapter 870. When used in a WAN networking environment, the exemplary computer 800 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the exemplary computer 800, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

The subject matter described above can be implemented in hardware, in software, or in both hardware and software. In certain implementations, the exemplary flexible rules, identity information management processes, engines, and related methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The invention claimed is:

1. A computer-implemented method for synchronizing information in namespaces stored on one or computer storage media, the method comprising:

receiving an indication of a change to information in a first namespace, the indication comprising a notice that an entity was added to the first namespace;

based on the indication, determining if an entity in a second namespace exists that is related to the information;

if so, determining if the entity in the second namespace has a characteristic that conflicts with the information, the characteristic comprising a name of the entity in the second namespace; and if a conflict exists:

creating a temporary placeholder within with the second namespace;

modifying the entity in the second namespace to resolve the conflict, wherein modifying the entity in the second namespace comprises:

associating the entity in the second namespace with an indication that the name of the entity in the second namespace is no longer valid; and altering the characteristic of the entity in the second namespace to eliminate the conflict; and removing the temporary placeholder from the second namespace after modifying the entity.

2. The method of claim 1, wherein the conflict comprises a name collision between the entity in the first namespace and the entity in the second namespace.

3. The method of claim 1, wherein altering the characteristic comprises modifying the name of the entity in the second namespace.

4. The method of claim 3, wherein modifying the name comprises replacing the name with a unique identifier.

5. The method of claim 3, wherein modifying the name comprises setting a flag associated with the entity in the second namespace to indicate that the name of the entity in the second namespace is transient.

6. A computer-readable storage medium having computer-executable instructions for performing the method of claim 1.

7. A computer-implemented method for synchronizing information in namespaces stored on one or more computer storage media, the method comprising:

receiving an indication of a change to information in a first namespace, the indication of the change comprising a notice of a reference to an entity in a second namespace, and wherein the reference indicates that the information in the first namespace refers to the entity;

determining that the entity has a characteristic that conflicts with the information in the first namespace;

creating a temporary representation of the entity within the second namespace, the temporary representation of the entity comprising a phantom entity in the second namespace;

receiving a second indication of a second change to information in the first namespace and, in response to the second indication, modifying a state of the phantom entity; and removing the phantom entity from the second namespace upon resolving the conflict between the characteristic of the entity and the information in the first namespace.

8. The method of claim 7, wherein the phantom entity includes a flag indicating a state of the phantom entity.

9. The method of claim 7, wherein the second indication comprises an instruction to create the entity in the second namespace.

10. A computer-readable storage medium having computer-executable instructions for performing the method of claim 7.

11. A computer-readable storage medium having computer-executable components, comprising:

a synchronization environment comprising an associated external namespace, an associated central namespace, and a synchronization mechanism, the synchronization mechanism being configured to receive, in a first order that differs from a second order, change information from the external namespace that identifies a plurality of changes to at least one object in the external namespace, the second order being a temporal order in which the plurality of changes occurred to the at least one object in the external namespace, the synchronization mechanism further comprising:

a name resolving component being configured to avoid name collisions and comprising a first subspace for transient objects and a second subspace for non-transient objects, one or more of the non-transient objects comprising objects that have not been identified as having a name that is no longer valid; and a temporary placeholder component within the central namespace, the temporary placeholder component comprising an identifier on a phantom entity in the central namespace, the phantom entity indicating that an object that is referred to by another object in the central namespace has not yet been formally created, the temporary placeholder component being operative to:

avoid a conflict created by a dangling reference, the dangling reference comprising an error corresponding to one object in the central namespace referring to another object in the central namespace that does not exist; and be removed from the central namespace when the conflict is resolved.

12. The computer-readable storage medium of claim 11, wherein the central namespace includes a plurality of objects that are correlated to a corresponding plurality of objects in the external namespace.

13. The computer-readable storage medium of claim 11, wherein the name collision comprises an error corresponding to two objects in the central namespace having similar names.

14. The computer-readable storage medium of claim 13, wherein the transient objects comprise objects that have been identified as having a name that is no longer valid.

* * * * *